United States Patent
Uesaka et al.

(10) Patent No.: US 8,887,596 B2
(45) Date of Patent: Nov. 18, 2014

(54) STEERING COLUMN APPARATUS

(71) Applicant: Fuji Kiko Co., Ltd., Kosai (JP)

(72) Inventors: Yota Uesaka, Toyohashi (JP); Shigeru Hoshino, Toyota (JP); Eiji Tanaka, Nara (JP)

(73) Assignees: Fuji Kiko Co., Ltd., Kosai-shi (JP); Toyota Jidosha Kabushiki Kaisha, Toyota-shi (JP); JTEKT Corporation, Osaka-shi (JP)

( * ) Notice: Subject to any disclaimer, the term of this patent is extended or adjusted under 35 U.S.C. 154(b) by 112 days.

(21) Appl. No.: 13/686,419

(22) Filed: Nov. 27, 2012

(65) Prior Publication Data

US 2013/0133460 A1    May 30, 2013

(30) Foreign Application Priority Data

Nov. 29, 2011   (JP) ................. 2011-259755

(51) Int. Cl.
   B62D 1/18   (2006.01)
   B62D 1/19   (2006.01)
(52) U.S. Cl.
   CPC .................... B62D 1/195 (2013.01)
   USPC ............. 74/493; 280/775; 280/776; 280/777
(58) Field of Classification Search
   USPC ............. 74/493; 280/775, 776, 777, 778, 779
   See application file for complete search history.

(56) References Cited

U.S. PATENT DOCUMENTS

| | | | |
|---|---|---|---|
| 6,419,269 B1 * | 7/2002 | Manwaring et al. ........... | 280/775 |
| 6,685,225 B2 | 2/2004 | Hancock et al. | |
| 7,354,068 B2 * | 4/2008 | Ishida et al. ................... | 280/775 |
| 7,360,793 B2 | 4/2008 | Hoshino et al. | |
| 7,651,132 B2 * | 1/2010 | Cho et al. ...................... | 280/777 |
| 8,382,157 B2 * | 2/2013 | Welker et al. ................. | 280/779 |
| 8,596,161 B2 * | 12/2013 | Maniwa et al. ................. | 74/493 |
| 2005/0066761 A1 * | 3/2005 | Arihara ........................... | 74/493 |
| 2005/0225068 A1 * | 10/2005 | Ishida et al. ................... | 280/775 |
| 2005/0268739 A1 * | 12/2005 | Sato et al. ...................... | 74/492 |
| 2005/0269812 A1 * | 12/2005 | Yamada ......................... | 280/777 |
| 2006/0290128 A1 * | 12/2006 | Ridgway et al. .............. | 280/777 |
| 2007/0013183 A1 * | 1/2007 | Jensen et al. .................. | 280/777 |
| 2007/0085317 A1 * | 4/2007 | Russell et al. ................. | 280/777 |
| 2007/0137381 A1 * | 6/2007 | Arihara ........................... | 74/493 |
| 2007/0272049 A1 | 11/2007 | Eggers et al. | |

FOREIGN PATENT DOCUMENTS

| | | |
|---|---|---|
| EP | 2 388 176 A2 | 11/2011 |
| JP | 2002-137744 A | 5/2002 |
| JP | 2005-219641 A | 8/2005 |
| JP | 2006-62434 A | 3/2006 |
| JP | 2007-504986 A | 3/2007 |
| JP | 2008-18920 A | 1/2008 |
| JP | 2009-227183 A | 10/2009 |

* cited by examiner

Primary Examiner — Toan To
(74) Attorney, Agent, or Firm — Foley & Lardner LLP

(57) ABSTRACT

A steering column apparatus has a fixed bracket fixed to a vehicle body and having a pair of long holes extending parallel to each other along a backward-and-forward direction; a movable bracket arranged movably in the backward-and-forward direction; a pair of bolts and a pair of nuts for fixing the movable bracket to a rear portion of the fixed bracket so that the movable bracket can move in the backward-and-forward direction with respect to the fixed bracket; a spring plate having pressing portions for holding the movable bracket at the rear portion of the fixed bracket by pressing the fixed bracket against the movable bracket; a shear pin connecting the fixed bracket and the movable bracket at the rear portion of the fixed bracket; and first and second low friction elements. Upon a secondary collision, the movable bracket smoothly moves toward a vehicle front side together with the spring plate.

6 Claims, 9 Drawing Sheets

STEERING COLUMN APPARATUS

BACKGROUND OF THE INVENTION

The present invention relates to a steering column apparatus which mitigates an impact occurring due to occupant's movement toward a vehicle front side upon an occurrence of a secondary collision.

A steering column provided in a steering column apparatus for steering a vehicle is connected to a vehicle body with sufficient supporting rigidity secured. The steering column is required, upon the occurrence of the secondary collision, to smoothly move toward the vehicle front side along an axis of the steering column and mitigate the impact that acts on the occupant.

As a related art steering column apparatus, for example, it is disclosed in Japanese Patent Provisional Publication "tokuhyou" No. 2007-504986 (hereinafter is referred to as "JP2007-504986"). As disclosed in FIG. 1 in JP2007-504986, a bracket 2 having, in a middle thereof, a slot 6 is mounted on a vehicle body, and a bracket slide 13 shown in FIG. 3 in JP2007-504986 is arranged below the bracket 2. The bracket slide 13 is connected to a sliding block 15 that is arranged in the slot 6 at an upper portion of the bracket 2 via two screws 16 inserted in the slot 6. Further, the bracket slide 13 is connected to a lower surface, at a vehicle rear side, of the bracket 2 via three fastening elements 14. A casing tube 8 provided therein with a steering shaft 9 is joined to the bracket slide 13 by a clamping apparatus 12 via lamella assemblies 11 arranged at both sides of the casing tube 8.

As shown in FIG. 2 in JP2007-504986, when a force A in an axial direction (a shaft direction) of the steering shaft 9 acts on the steering shaft 9, the force A is transmitted to the bracket slide 13. Then when the fastening elements 14 are released, the bracket slide 13 moves toward the vehicle front side with respect to the bracket 2. That is, as shown in FIG. 5 in JP2007-504986, the fastening element 14 is fixed to the bracket 2 via a rivet 21, and a tear-off pin 22 that is formed of plastic is provided between the fastening element 14 and the bracket slide 13. When a force that exceeds a predefined magnitude is applied to the bracket slide 13, the tear-off pin 22 tears, and the bracket slide 13 is released from the fastening elements 14. In other words, a supporting rigidity of the bracket slide 13 is secured by the fastening elements 14. Then, upon the occurrence of the secondary collision, the tear-off pin 22 tears and the bracket slide 13 is released, the bracket slide 13 thus moves toward the vehicle front side along the slot 6. Here, FIG. 7 in JP2007-504986 shows other embodiment.

SUMMARY OF THE INVENTION

In JP2007-504986, however, in addition to the sliding block 15 and the two screws 16 which are provided in order for the bracket slide 13 to be able to move, the steering column apparatus is further provided with the fastening elements 14, as separate parts from the sliding block 15 and the two screws 16, for securing the supporting rigidity. Because of this, parts count increases, also cost increases. Furthermore, since a space to arrange the fastening elements 14 is required, the bracket 2 mounted on the vehicle body increases in size.

On the other hand, it is conceivable that the supporting rigidity is secured by the sliding block 15 and the two screws 16 allowing the movement of the bracket slide 13. However, if a structure in which the bracket 2 is sandwiched between the bracket slide 13 and the sliding block 15 is employed in order to secure the supporting rigidity, a clamping load is imposed on the bracket 2, and this clamping load becomes a resistance upon the movement of the bracket slide 13 together with the sliding block 15 toward the front side of the vehicle body along the slot 6, and warp or distortion arises in the bracket slide 13. This causes an obstruction to a smooth movement of the bracket slide 13.

It is therefore an object of the present invention to provide a steering column apparatus which is capable of solving the above problem.

According to one aspect of the present invention, a steering column apparatus comprises: a fixed bracket which is fixed to a vehicle body, the fixed bracket having; (a) a flat attachment portion; (b) a pair of long holes formed on the attachment portion so as to extend substantially parallel to each other along a backward-and-forward direction of the vehicle body; and (c) a fitting hole formed on the attachment portion; a movable bracket which is arranged below the attachment portion of the fixed bracket movably in the backward-and-forward direction of the vehicle body with respect to the fixed bracket and supports a steering column, the movable bracket having; (d) an attachment part; (e) a pair of inserting holes formed on the attachment part; and (f) a fitting hole formed at a corresponding position to the fitting hole of the fixed bracket on the attachment part; a pair of bolts and a pair of nuts, a pair of the bolts inserted in a pair of the long holes and a pair of the inserting holes and screwed into a pair of the nuts, which fix the movable bracket to a rear portion of the fixed bracket so that the movable bracket can move in the backward-and-forward direction of the vehicle body with respect to the fixed bracket; a spring plate which is arranged between an inner side edge surface of the bolt or the nut and the fixed bracket, the spring plate having; (g) pressing portions formed at front and rear positions of the spring plate with respect to a pair of the bolts and extending toward the fixed bracket from the spring plate, for holding the movable bracket at the rear portion of the fixed bracket by pressing the fixed bracket against the movable bracket on a pair of lines that extend substantially parallel to each other and orthogonally to the long holes of the fixed bracket; a shear pin which is fitted into the fitting hole of the fixed bracket and the fitting hole of the movable bracket and connects the fixed bracket and the movable bracket at the rear portion of the fixed bracket; a first low friction element which is provided between the fixed bracket and the movable bracket; and a second low friction element which is provided between the fixed bracket and the spring plate.

The other objects and features of this invention will become understood from the following description with reference to the accompanying drawings.

DETAILED DESCRIPTION OF THE INVENTION

Embodiments of a steering column apparatus of the present invention will be explained below with reference to the drawings.

[Configuration]

Figure 1:
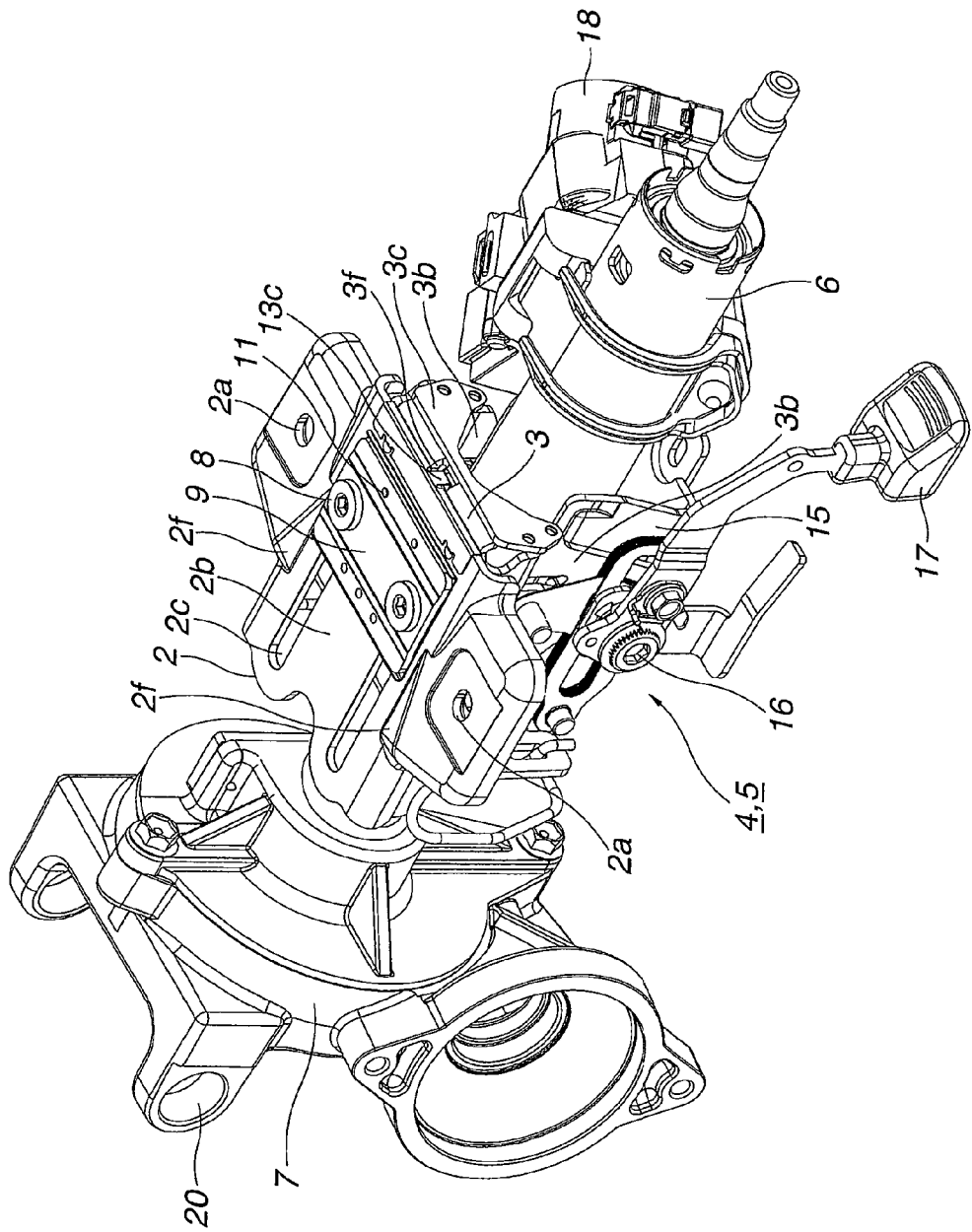
FIG. 1 is a perspective view of a steering column apparatus of an embodiment of the present invention.

As shown in FIG. 1, a steering column apparatus 1 mainly has a fixed bracket 2 that is fixed to a vehicle body, a movable bracket 3 that can move with respect to the fixed bracket 2 in a backward-and-forward direction of the vehicle body, a steering column 6 that is provided at the movable bracket 3 movably in an upward-and-downward direction through a tilt mechanism 4 and movably in the backward-and-forward direction through a telescopic mechanism 5, and a power steering mechanism 7 that is provided at an front end of the steering column 6.

Figure 5:
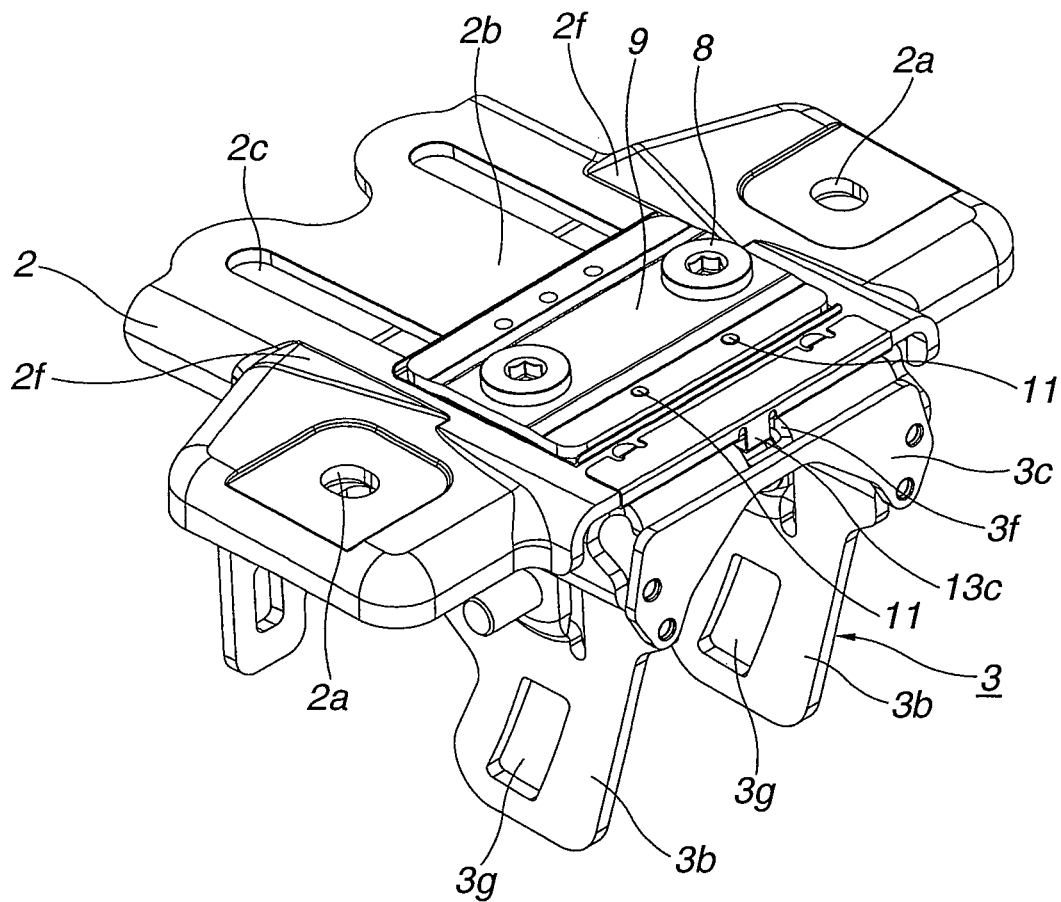
FIG. 5 is a perspective view of a fixed bracket and a movable bracket.
Figure 6:
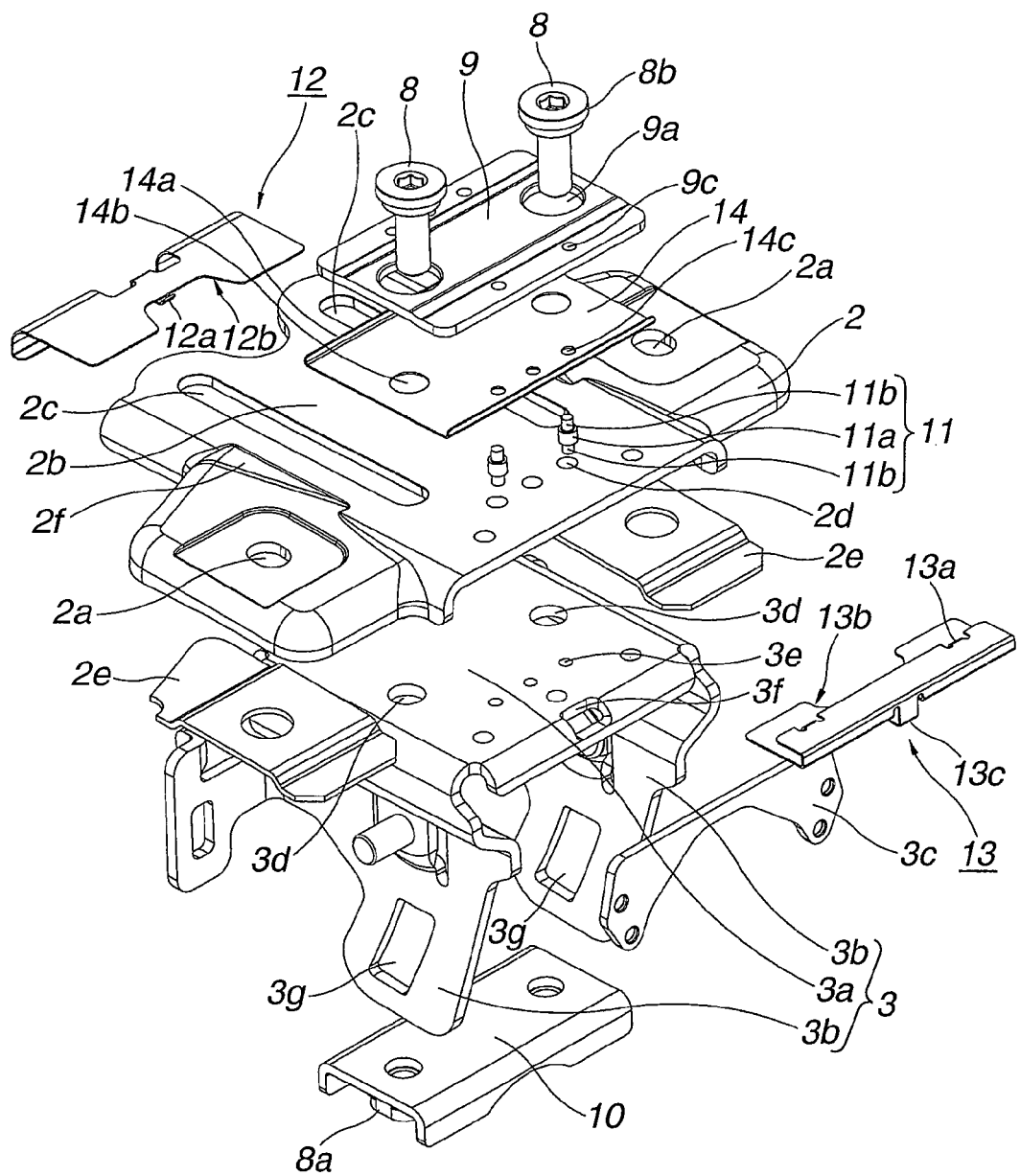
FIG. 6 is a perspective exploded view of the fixed bracket and the movable bracket.

FIG. 5 is a perspective view of the fixed bracket 2 and the movable bracket 3. FIG. 6 is a perspective exploded view of these fixed bracket 2 and movable bracket 3. The fixed bracket 2 is provided, at right and left sides thereof, with connecting holes 2a for fixing the fixed bracket 2 to the vehicle body, also provided, in a middle thereof, with a flat attachment portion 2b where the movable bracket 3 is attached movably in the backward-and-forward direction of the vehicle body. The attachment portion 2b is provided with a pair of long holes 2c which extend substantially parallel to each other along the backward-and-forward direction of the vehicle body. In FIG. 6, a reference sign 2e denotes a reinforcing member that reinforces a periphery of the connecting hole 2a. The reinforcing member 2e is joined to the fixed bracket 2 by welding.

Figure 3:
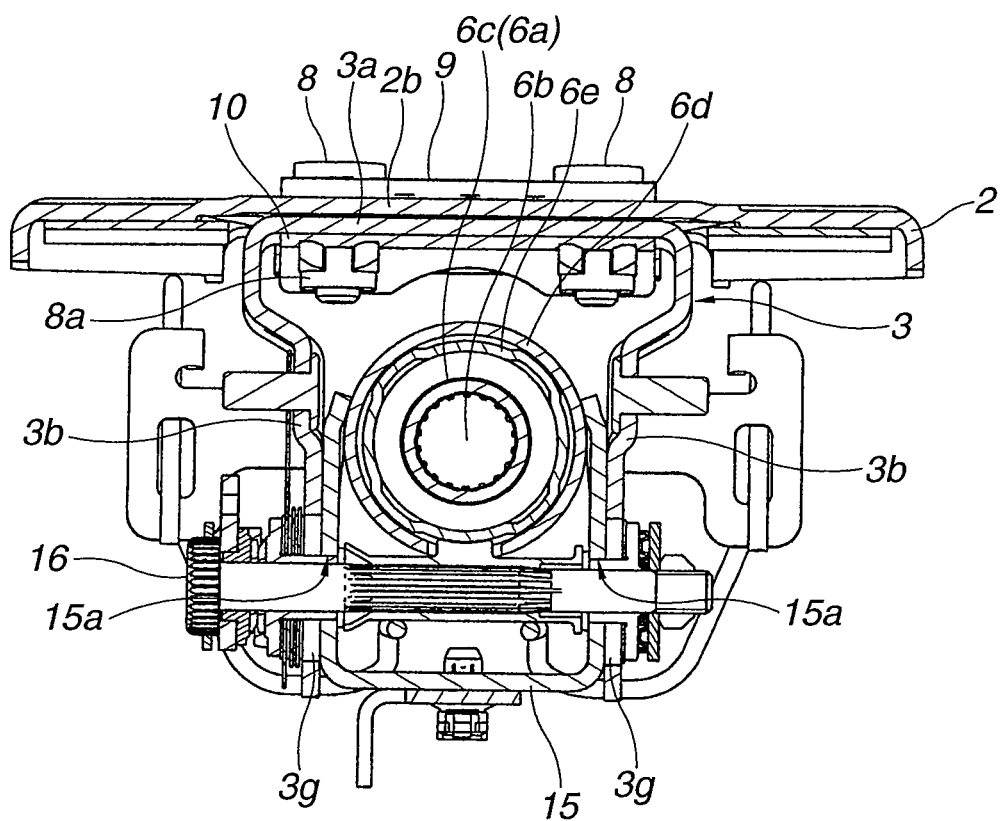
FIG. 3 is a sectional view of the steering column apparatus, cut perpendicularly to an axis of a steering column.
Figure 4:
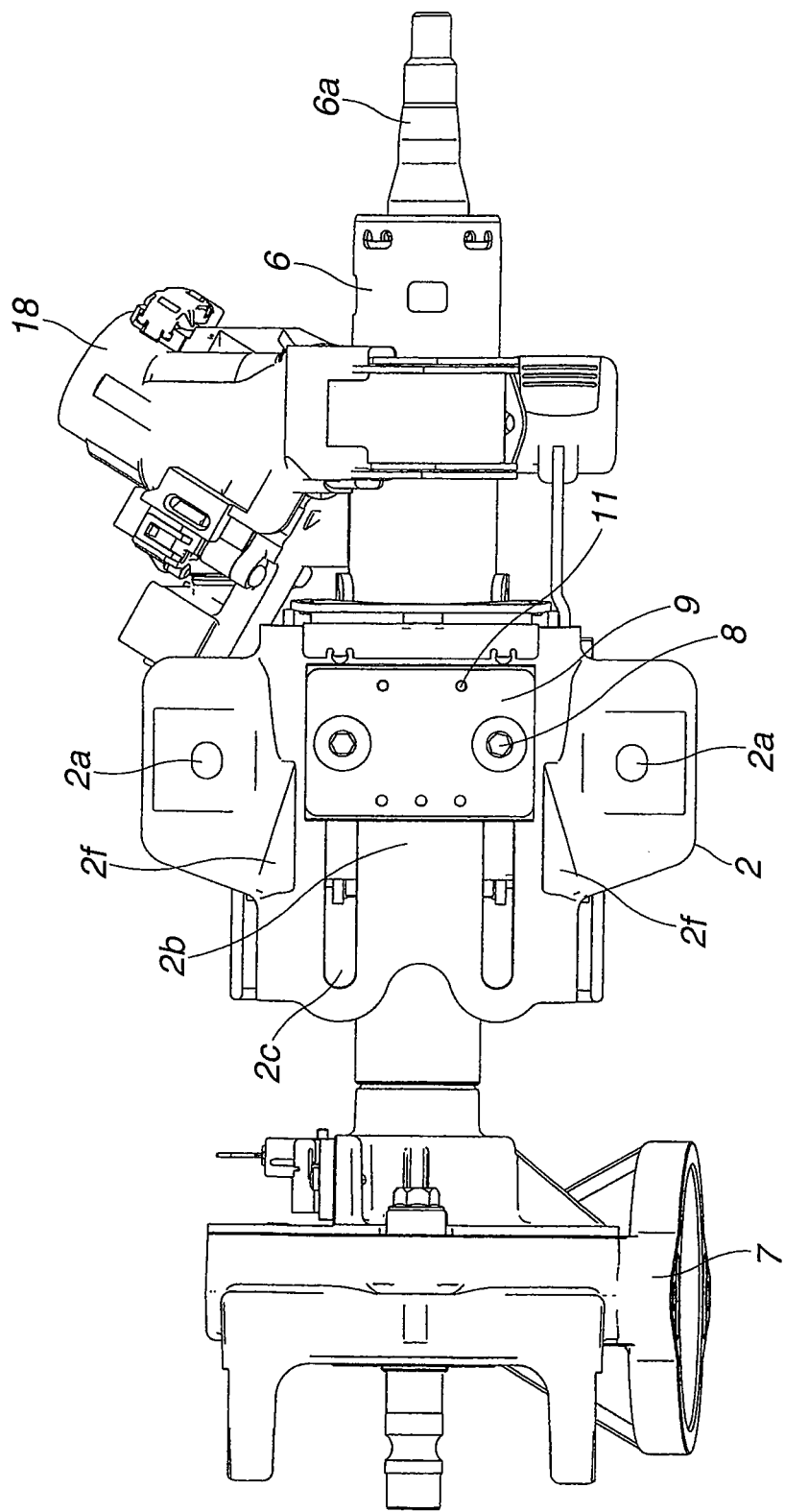
FIG. 4 is a plan view of the steering column apparatus.

The movable bracket 3 that supports the steering column 6 is arranged below the attachment portion 2b provided in the middle of the fixed bracket 2. As shown in FIG. 3, the movable bracket 3 has a substantially reverse U-shaped cross section. The movable bracket 3 has an attachment part 3a that is attached to a lower side of the attachment portion 2b and side bracket parts 3b at both sides of the attachment part 3a. Further, a reinforcing member 3c is connected to the movable bracket 3 at a vehicle rear side of the movable bracket 3.

A pair of inserting holes 3d are formed at right and left positions on the attachment part 3a of the movable bracket 3. Then, a pair of bolts 8 to fix the movable bracket 3 to a vehicle rear side (or a vehicle rear portion) of the fixed bracket 2 are inserted, from a top side, into a pair of the inserting holes 3d and a pair of the long holes 2c formed at the attachment portion 2b so that the movable bracket 3 can move in the backward-and-forward direction of the vehicle body, and as shown in FIG. 7, a nut 8a is screwed on a lower end of the respective bolts 8.

Figure 7:
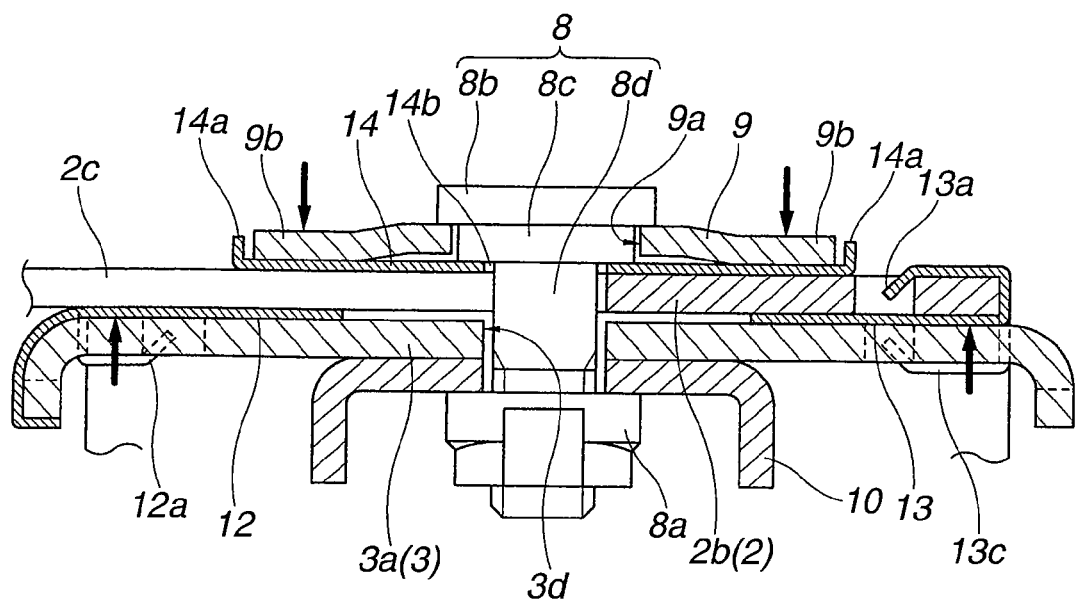
FIG. 7 is an enlarged view of main parts of the fixed bracket and the movable bracket.

As shown in FIG. 7, a spring plate 9 is arranged between an inner side edge surface of a head 8b of the bolt 8 and the fixed bracket 2. Between the bolt head 8b and a thread portion 8d of the bolt 8, a neck portion 8c having a mid-thickness between those of the bolt head 8b and the bolt thread portion 8d is formed. Then, this part (the neck portion 8c) is inserted into an inserting hole 9a that is formed at the spring plate 9.

As shown in FIG. 7, pressing portions 9b, which protrude or extend toward the fixed bracket 2 from a substantially middle of the spring plate 9 in the backward-and-forward direction of the vehicle body, are formed at front and rear positions of the spring plate 9 with respect to a pair of the bolts 8. The pressing portions 9b are provided to hold the movable bracket 3 at the vehicle rear side of the fixed bracket 2 by pressing the fixed bracket 2 against the movable bracket 3. The pressing portions 9b are formed on a pair of lines that extend substantially parallel to each other and orthogonally to the long holes 2c of the fixed bracket 2. Here, as can be seen in the drawings, a patch plate 10 is provided between the movable bracket 3 and the nuts 8a. This patch plate 10 is provided to improve workability in assembly by previously fixing the nuts 8a to the patch plate 10, also to reduce a surface pressure that is exerted on the attachment part 3a of the movable bracket 3 from the nuts 8a then to reinforce the attachment part 3a.

Next, a structure for holding the movable bracket 3 at the fixed bracket 2 will be explained. As shown in FIG. 6, fitting holes into which a shear pin 11 is fitted are formed at the vehicle rear side of the fixed bracket 2 and the movable bracket 3. The shear pin 11 (in the drawings, two shear pins 11) connects the fixed bracket 2 and the movable bracket 3 at the vehicle rear side of the fixed bracket 2 by being inserted and fitted into the fitting holes of both of the fixed bracket 2 and the movable bracket 3. More specifically, the shear pin 11 has, in a middle thereof, a large diameter portion 11a, also has, at both ends thereof, small diameter portions 11b. As the fitting hole formed at the fixed bracket 2, a large diameter hole 2d where the large diameter portion 11a is inserted and housed is formed. As the fitting hole formed at the movable bracket 3, a small diameter hole 3e where the small diameter portion 11b is inserted and housed is formed at a corresponding position to the large diameter hole 2d. Further, the spring plate 9 is provided with a small diameter hole 9c, as the fitting hole, where the small diameter portion 11b is inserted and housed.

Between the fixed bracket 2 and the movable bracket 3, as a first low friction element, a front side low friction plate 12 is provided at a vehicle front side position with respect to a pair of the bolts 8, while a rear side low friction plate 13 is provided at a vehicle rear side position with respect to a pair of the bolts 8. The front side low friction plate 12 is provided with a connecting portion 12a that connects with the movable bracket 3 so that when the movable bracket 3 moves toward the vehicle front side, the front side low friction plate 12 also moves together with the movable bracket 3. On the other hand, the rear side low friction plate 13 is provided with a connecting portion 13a to connect with the fixed bracket 2 so that when the movable bracket 3 moves toward the vehicle front side, the rear side low friction plate 13 is connected with the fixed bracket 2 then is released or separated from the movable bracket 3.

As shown in FIG. 7, the front side low friction plate 12 and the rear side low friction plate 13 are arranged so as to be positioned at an overlapping position with the pressing portion 9b respectively in an axis direction of a pair of the bolts 8 when the movable bracket 3 is positioned at the vehicle rear side of the fixed bracket 2. The front side low friction plate 12 has, in a middle in a right-and-left direction of the vehicle body thereof, a cutting portion 12b. The rear side low friction plate 13 also has, in a middle in a right-and-left direction of the vehicle body thereof, a cutting portion 13b. With these structures, the number of positions where the pressing portions 9b press the fixed bracket 2 against the movable bracket 3 through the front side low friction plate 12 and the rear side low friction plate 13 is four, namely that the pressing portions 9b press the fixed bracket 2 against the movable bracket 3 through the front side low friction plate 12 and the rear side low friction plate 13 at four positions which are positioned at front and rear sides and right and left sides of the spring plate 9 with respect to a pair of the bolts 8.

Figure 8:
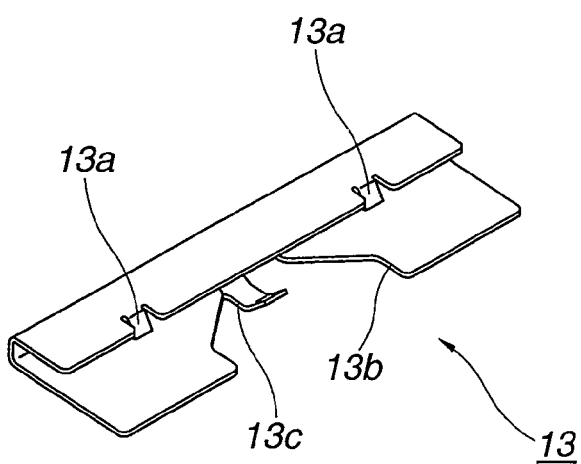
FIG. 8 is a perspective view of a rear side low friction plate.

A surface of the front side low friction plate 12 where the front side low friction plate 12 touches the fixed bracket 2, and a surface of the rear side low friction plate 13 where the rear side low friction plate 13 touches the movable bracket 3, are coated with a low friction coating. This low friction coating has insulation quality. Because of this, although horn current flows from a battery to a steering wheel 19 joined to the steering column 6 when the movable bracket 3 is positioned at the vehicle rear side of the fixed bracket 2, no current flows between the fixed bracket 2 and the movable bracket 3. Thus, since an inner side surface of the rear side low friction plate 13 where the coating is not coated touches the fixed bracket 2 as shown in FIG. 7, in order for the current to flow between the fixed bracket 2 and the movable bracket 3, the rear side low friction plate 13 is provided with a current-carrying portion 13c that protrudes downward which is an opposite side to the connecting portion 13a, and an inner side surface of the fixed bracket 2 is brought into contact with a lower surface of the movable bracket 3. The current-carrying portion 13c is formed into a substantially L-shape as shown in FIG. 8 so that an inner side surface of the current-carrying portion 13c touches the lower surface of the movable bracket 3.

Figure 2:
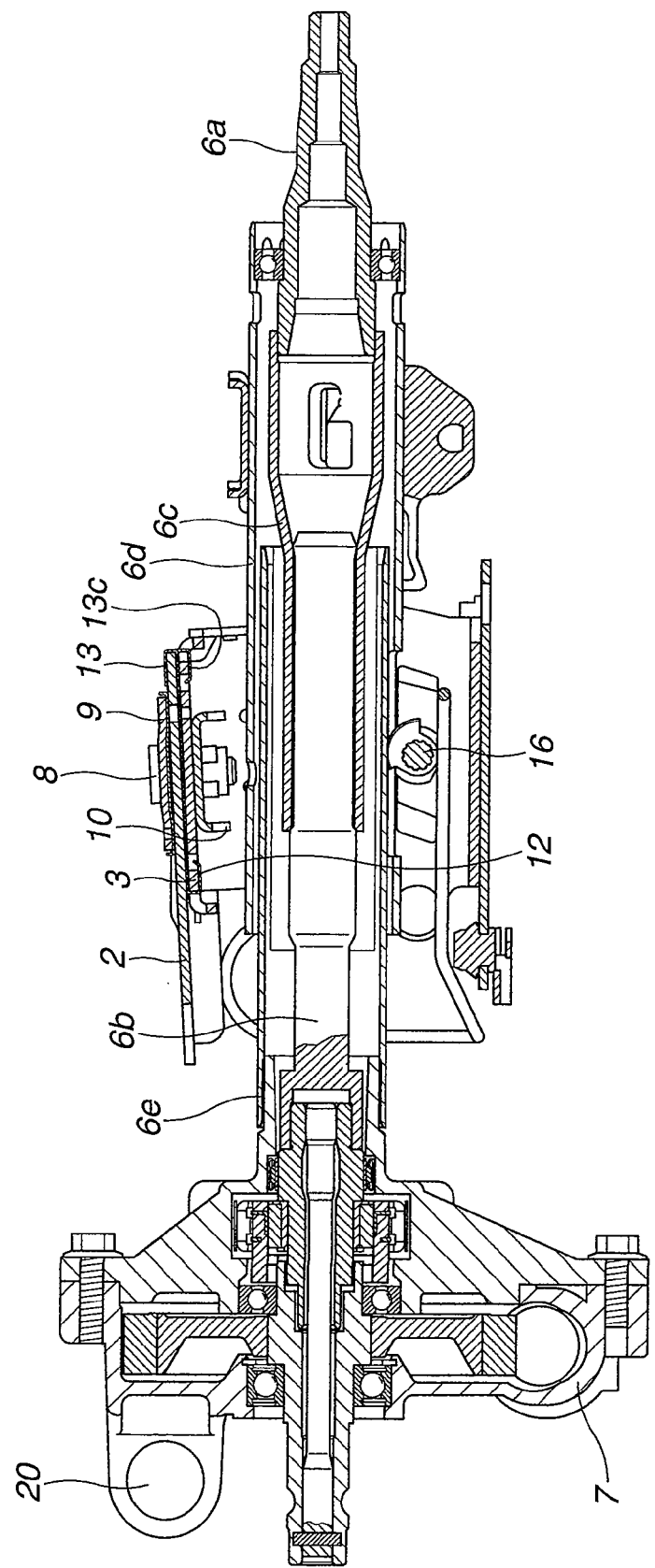
FIG. 2 is a sectional view of the steering column apparatus of the embodiment.

As shown in FIGS. 5 and 6, a cutting portion 3f is formed in a middle of a rear edge portion of the attachment part 3a of the movable bracket 3. The current-carrying portion 13c is inserted into the cutting portion 3f, then as shown in FIGS. 2 and 7, the inner side surface of the current-carrying portion 13c touches the lower surface of the movable bracket 3.

Between the fixed bracket 2 and the spring plate 9, as a second low friction element, a second low friction plate 14 is provided. The second low friction plate 14 has bending portions 14a which are formed by bending both edge portions at front and rear sides of the second low friction plate 14 in an upper direction. A lower surface of the second low friction plate 14 is coated with the low friction coating. As can be seen in FIG. 6, an inserting hole 14b into which the bolt 8 is inserted and a fitting hole 14c into which the small diameter portion 11b of the shear pin 11 is inserted are formed at the second low friction plate 14 (in the drawing, two inserting holes 14b and two fitting holes 14c).

The steering column 6 is supported by the movable bracket 3. As shown in FIG. 2, the steering column 6 has an upper shaft 6a and a lower shaft 6b which have an extendable structure and an upper jacket 6d and a lower jacket 6e which rotatably support these upper and lower shafts 6a, 6b and have the extendable structure. As shown in FIG. 3, a substantially U-shaped distance member 15 is joined to a lower surface of the upper jacket 6d by the welding. Here, a hollow intermediate shaft 6c that forms a key-lock hole is connected to the upper shaft 6a by the welding, then these upper shaft 6a and intermediate shaft 6c are formed as an integrated shaft.

The distance member 15 is provided with telescopic long holes 15a along a longitudinal direction of the steering column 6, which form the telescopic mechanism 5. The side bracket parts 3b of the movable bracket 3 are provided with tilt long holes 3g (see FIGS. 5 and 6) along the upward-and-downward direction, which form the tilt mechanism 4. A lock bolt 16 is inserted into these tilt long holes 3g and telescopic long holes 15a, and an operation lever 17 for fastening/unfastening (or tightening/loosening) the lock bolt 16 is provided.

Further, as shown in FIG. 1, the power steering mechanism 7 is provided at the front end of the steering column 6. The power steering mechanism 7 is provided, at an upper portion thereof, with inserting holes 20, and a tilt shaft 21 (shown only in FIG. 9) is inserted into the inserting holes 20. The steering column 6 is rotatably connected to the vehicle body through the tilt shaft 21. The tilt shaft 21 is a tilting axis when tilt-adjusting the steering column 6 by a function of the tilt mechanism 4. The steering column 6 is provided, at a rear end portion thereof, with a key-lock unit 18 that locks the steering wheel 19 (shown only in FIG. 9) in order for the steering wheel 19 not to rotate (or turn).

Figure 10:
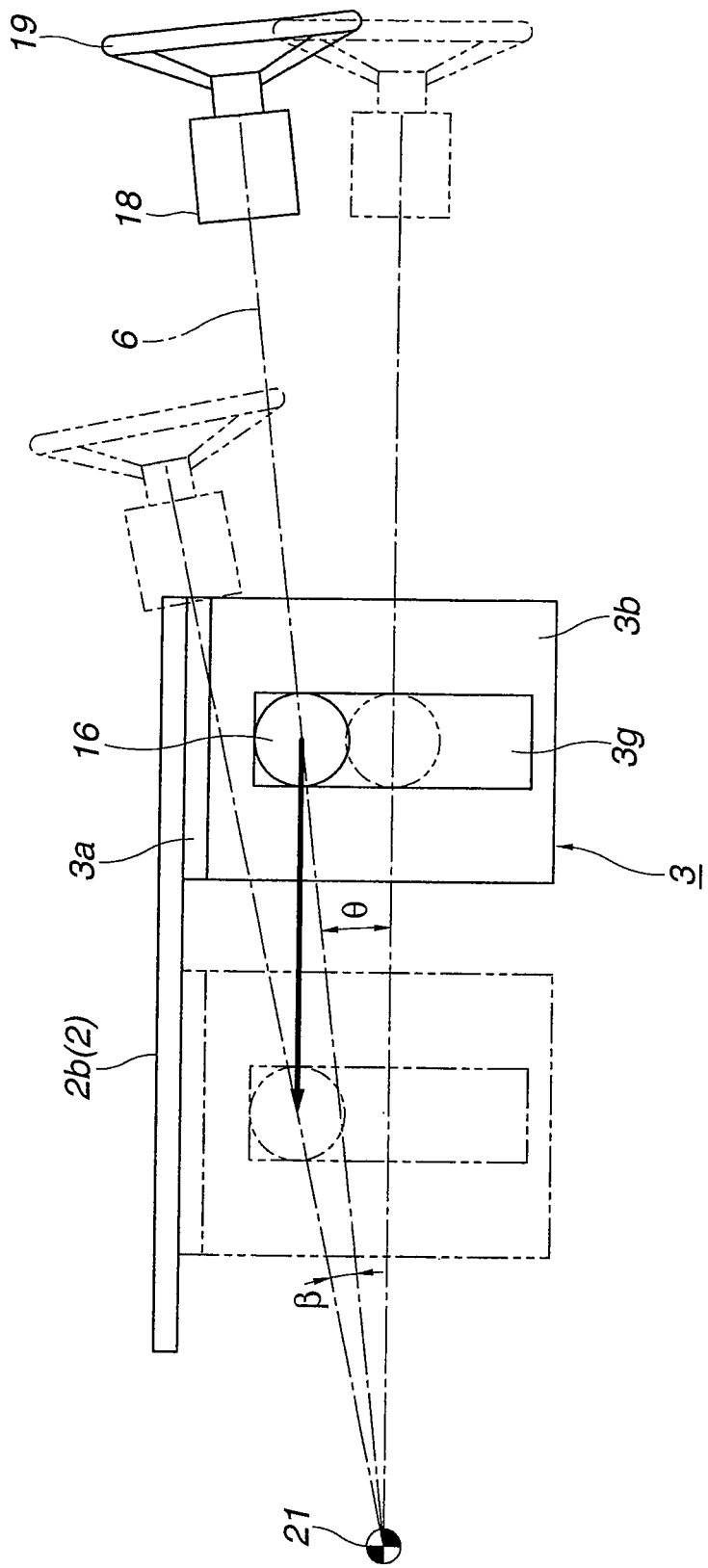
FIG. 10 is a reference drawing for explaining a relationship between the fixed bracket and the steering column, according to a related art steering column apparatus.

In addition to the above configuration or structure, in the present embodiment, an attachment angle of the attachment portion 2b of the fixed bracket 2 with respect to the vehicle body is different from that of a related art steering column apparatus. In a case of the related art steering column apparatus, as shown in FIG. 10, as a design criterion, the attachment angle of the attachment portion 2b is set to be substantially parallel to an axis (the shaft) of the steering column 6 when the lock bolt 16 is set to a middle height position of the tilt long hole 3g. Because of this, when the steering column 6 is set to an uppermost position of the tilt long hole 3g, the axis of the steering column 6 tilts by θ from a reference angle.

Figure 9:
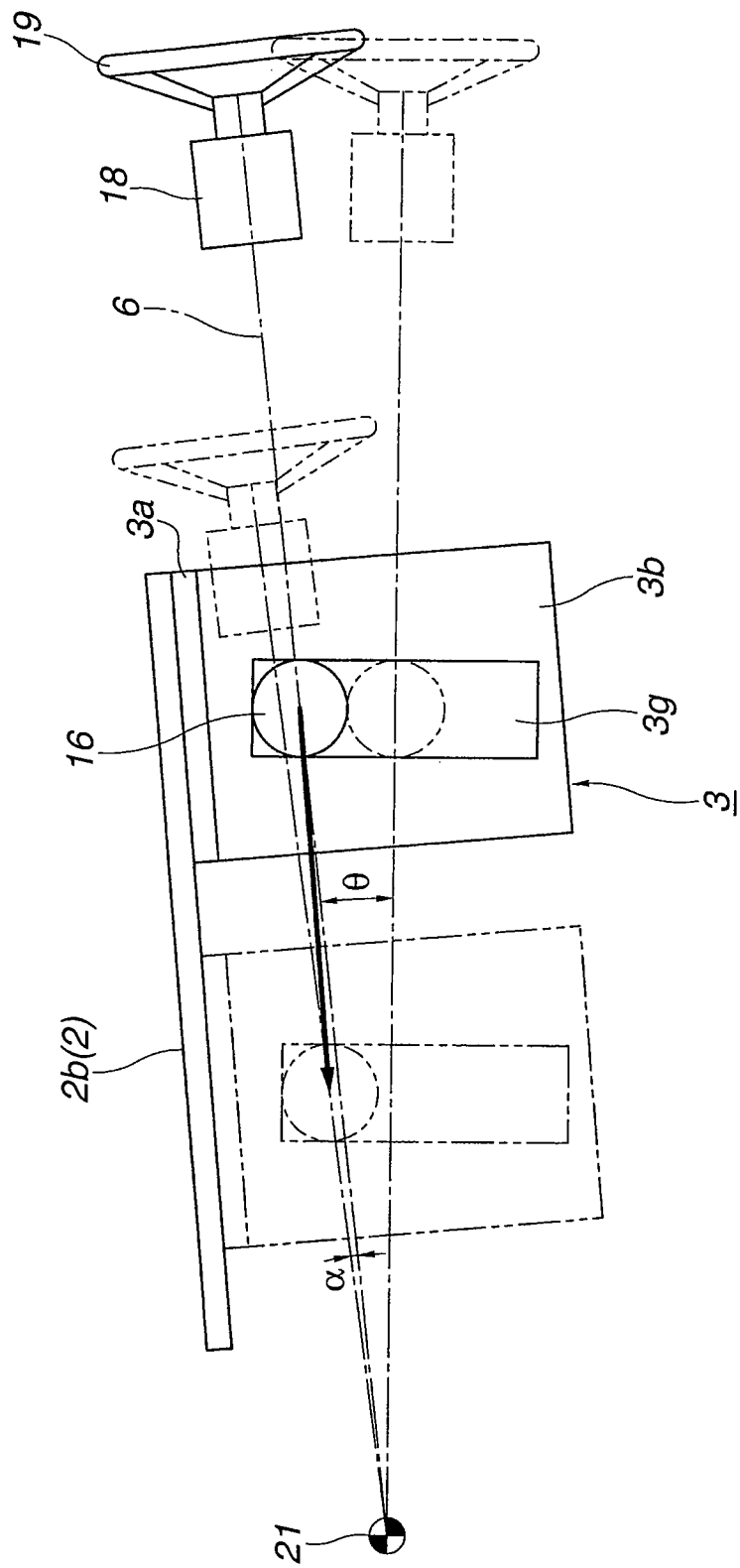
FIG. 9 is a drawing for explaining a relationship between the fixed bracket and the steering column, according to the present invention.

On the other hand, in the present embodiment, as shown in FIG. 9, the fixed bracket 2 is fixed to the vehicle body with a front side of the fixed bracket 2 tilting downwardly so that the attachment portion 2b of the fixed bracket 2 is substantially parallel to the axis of the steering column 6 when the steering column 6 is set to the uppermost position of the tilt long hole 3g. In order to change the angle of the attachment portion 2b with respect to an attachment part of the vehicle body in this way, as shown in FIG. 1, the fixed bracket 2 is provided with twisting portions 2f having a reverse tapered surface which connects a part where the connecting hole 2a of the fixed bracket 2 is formed and the attachment portion 2b so that the vehicle front side of the attachment portion 2b tilts downwardly with respect to the part where the connecting hole 2a.

Next, working and effects of the steering column apparatus will be explained.

According to the present invention, in a normal state, the movable bracket 3 is held at a lower side of the rear portion (the rear side) of the fixed bracket 2 by the shear pin 11 with the fixed bracket 2 sandwiched by the pressing portion 9b of the spring plate 9 and the movable bracket 3 by screwing the bolt 8 into the nut 8a. When a load toward the vehicle front side is applied to the movable bracket 3 by a secondary collision, since the movable bracket 3 attempts to move together with the spring plate 9 with respect to the fixed bracket 2, the shear pin 11 is cut or sheared, then the movable bracket 3 and the spring plate 9 move toward the vehicle front side with the movable bracket 3 and the spring plate 9 being integral with each other. At this time, since a pair of the bolts 8 move along a pair of the long holes 2c, the movable bracket 3 moves to the front side (the front portion) of the fixed bracket 2 while being guided in a predetermined direction. Since the front side low friction plate 12, the rear side low friction plate 13 and the second low friction plate 14 intervene between the spring plate 9, the fixed bracket 2 and the movable bracket 3, the movable bracket 3 can smoothly move.

According to the steering column apparatus, the pressing portions 9b of the spring plate 9 are provided on a pair of the lines that extend parallel to each other and orthogonally to the long holes 2c of the fixed bracket 2, at the front and rear positions of the spring plate 9 with respect to a pair of the bolts 8. Thus, a pressing area where the spring plate 9 presses the fixed bracket 2 becomes large, and stable supporting rigidity can be obtained in the normal state. Further, when the movable bracket 3 moves toward the vehicle front side with respect to the fixed bracket 2 upon the secondary collision, warp or distortion is suppressed, thereby allowing smooth movement of the movable bracket 3.

In addition, as a structure for supporting the movable bracket 3 at a rear edge side of the long hole 2c, only the spring plate 9 and the shear pin 11 are provided. Therefore, the structure for holding the movable bracket 3 can be easily achieved. Furthermore, a part of the structure in which the movable bracket 3 moves along a pair of the long holes 2c upon the occurrence of the secondary collision is the structure for holding the movable bracket 3 at the rear portion of the fixed bracket 2 in the normal state. This results in reduction of parts count.

According to the present invention, as the first low friction element, the front side low friction plate 12 and the rear side low friction plate 13 are provided, and when the movable bracket 3 moves forward upon the secondary collision, the rear side low friction plate 13 connecting with the fixed bracket 2 is separated or released from the movable bracket 3, while the front side low friction plate 12 connecting with the movable bracket 3 moves forward together with the movable bracket 3. Since the rear side low friction plate 13 is separated or released from the movable bracket 3 at the same time as the movement of the movable bracket 3, a pressing force between the fixed bracket 2 and the movable bracket 3 by the spring plate 9 and the bolt 8 becomes small, and a sliding resistance upon the movement of the movable bracket 3 decreases. As a consequence, the movable bracket 3 and the spring plate 9 smoothly move toward the vehicle front side with respect to the fixed bracket 2.

According to the steering column apparatus, since the rear side low friction plate 13 is separated from the movable bracket 3 according to the movement of the movable bracket 3 toward the vehicle front side upon the secondary collision, the pressing force to the rear side of the fixed bracket 2 by the pressing portions 9b of the spring plate 9 becomes small. This makes the movement of the movable bracket 3 with respect to the fixed bracket 2 easy.

According to the present invention, in the normal state, since part where the pressing portion 9b of the spring plate 9 presses the fixed bracket 2 is only four positions which are positioned at front and rear sides and right and left sides of the spring plate 9 and the surface pressure increases at these four positions, great supporting rigidity is obtained. On the other hand, upon the secondary collision, since the rear side low friction plate 13 is separated from the movable bracket 3, the pressing force between the fixed bracket 2 and the movable bracket 3 becomes small, and the sliding resistance decreases. Consequently, the movable bracket 3 and the spring plate 9 smoothly move toward the vehicle front side with respect to the fixed bracket 2.

According to the steering column apparatus, in the normal state, since the part where the pressing portion 9b of the spring plate 9 presses the fixed bracket 2 is only four positions which are positioned at front and rear sides and right and left sides of the spring plate 9, the surface pressure increases and stable supporting rigidity is obtained. On the other hand, upon the secondary collision, since the rear side low friction plate 13 is separated from the movable bracket 3, warp or distortion of a pair of the bolts 8 and a pair of the long holes 2c is suppressed, then the movable bracket 3 can move toward the vehicle front side.

According to the present invention, by fitting the large diameter portion 11a of the shear pin 11 into the large diameter hole 2d of the fixed bracket 2 and fitting the small diameter portions 11b of the shear pin 11 into the small diameter hole 3e of the movable bracket 3 and the small diameter hole 9c of the spring plate 9, the fixed bracket 2, the movable bracket 3 and the spring plate 9 are assembled, and positions of the movable bracket 3 and the spring plate 9 are held at a rear edge side of the fixed bracket 2. Upon the occurrence of the secondary collision, the shear pin 11 is sheared at two parts of upper and lower sides of the shear pin 11, then the movable bracket 3 and the spring plate 9 move toward the vehicle front side with respect to the fixed bracket 2.

According to the steering column apparatus, since the large diameter portion 11a is formed in the middle of the shear pin 11 and the small diameter portions 11b are formed at both edge sides of the shear pin 11, only by fitting the shear pin 11 into the large diameter hole 2d of the fixed bracket 2 and the small diameter hole 3e of the movable bracket 3 and the small diameter hole 9c of the spring plate 9, positioning of the fixed bracket 2, the movable bracket 3 and the spring plate 9 can be achieved. Then, the movable bracket 3 is held at the vehicle rear portion of the fixed bracket 2 until a load having a magnitude that shears the shear pin 11 is applied to the movable bracket 3 by the secondary collision.

According to the present invention, when an impact arises and is exerted on the steering column 6 upon the secondary collision, as shown in FIG. 9, first the lock bolt 16 is lifted to the uppermost position of the tilt long hole 3g, then the movable bracket 3 moves toward the vehicle front side along the attachment portion 2b (along the long holes 2c) of the fixed bracket 2. At this time, since the attachment portion 2b of the fixed bracket 2 is fixed to the vehicle body with the attachment portion 2b tilting so that the attachment portion 2b is at least substantially parallel to the axis of the steering column 6 of the case where the lock bolt 16 is positioned at the uppermost position of the tilt long hole 3g, the steering wheel 19 and its peripheral device, such as the key-lock unit 18, move in a direction substantially parallel to the attachment portion 2b of the fixed bracket 2, namely along an axis direction of the steering column 6.

According to the steering column apparatus, even when the steering column 6 moves to the uppermost position of the tilt long hole 3g by the secondary collision, the steering wheel 19 moves substantially along the axis direction of the steering column 6. Thus, an angle "α" of the steering column 6 after the movable bracket 3 moves to the front of the fixed bracket 2 with respect to a position of the steering column 6 when the lock bolt 16 is positioned at the uppermost position of the tilt long hole 3g is small, as compared with an angle "β" of the steering column 6 of the case of the related art steering column apparatus shown in FIG. 10. Hence, in the case of the steering column apparatus of the present invention, an amount of movement, in the upward-and-downward direction, of the steering column 6 is small, also an amount of movement, in the upward-and-downward direction, of the steering wheel 19 is small, and it is possible to avoid a situation in which the peripheral device of the steering wheel 19, such as the key-lock unit 18, interferes with the fixed bracket 2.

In the above embodiment, as the first low friction element (a first low friction plate), the front side low friction plate 12 and the rear side low friction plate 13 that is separated from the movable bracket 3 are provided. However, it is possible to provide only the front side low friction plate 12 as the first low friction plate. In this case, since the movable bracket 3 slightly tilts by an amount equivalent to a thickness of the rear side low friction plate 13 because of absence of the rear side low friction plate 13, a protruding portion, which protrudes by the amount equivalent to the thickness of the rear side low friction plate 13 from the fixed bracket 2 toward the movable bracket 3, could be provided at the fixed bracket 2. Even in this case, since the first low friction plate and a second low friction plate (the second low friction element) are present between the spring plate 9, the fixed bracket 2 and the movable bracket 3, the movable bracket 3 can smoothly move toward the vehicle front side with respect to the fixed bracket 2.

Further, in the above embodiment, the low friction plates are used as the first and second low friction elements. Instead of these low friction plates, each surface of the spring plate 9, the fixed bracket 2 and the movable bracket 3 could be coated with the low friction coating. Furthermore, although the cutting portions 12b and 13b are provided in the middle in the right-and-left direction of the vehicle body of the front side and rear side low friction plates 12 and 13, the front side and rear side low friction plates 12 and 13 might have no cutting portion.

Moreover, in the above embodiment, the small diameter hole 9c and the small diameter hole 3e are formed at the spring plate 9 and the movable bracket 3, as the fitting hole where the small diameter portion 11b of the shear pin 11 is inserted and housed. However, the small diameter portion 11b of the shear pin 11 could be formed only at a lower end of the shear pin 11, and the spring plate 9 has no fitting hole. In addition, in the above embodiment, although the bolt 8 is arranged at the top side and the nut 8a is arranged at a bottom side, arrangement of these bolt 8 and nut 8a could be made upside down.

The entire contents of Japanese Patent Application No. 2011-259755 filed on Nov. 29, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A steering column apparatus comprising:
    a fixed bracket which is fixed to a vehicle body, the fixed bracket having;
        (a) a flat attachment portion;
        (b) a pair of long holes formed on the attachment portion so as to extend substantially parallel to each other along a backward-and-forward direction of the vehicle body; and
        (c) a fitting hole formed on the attachment portion;
    a movable bracket which is arranged below the attachment portion of the fixed bracket movably in the backward-and-forward direction of the vehicle body with respect to the fixed bracket and supports a steering column, the movable bracket having;
        (d) an attachment part;
        (e) a pair of inserting holes formed on the attachment part; and
        (f) a fitting hole formed at a corresponding position to the fitting hole of the fixed bracket on the attachment part;
    a pair of bolts and a pair of nuts, a pair of the bolts inserted in a pair of the long holes and a pair of the inserting holes and screwed into a pair of the nuts, which fix the movable bracket to a rear portion of the fixed bracket so that the movable bracket can move in the backward-and-forward direction of the vehicle body with respect to the fixed bracket;
    a spring plate which is arranged between an inner side edge surface of the bolt or the nut and the fixed bracket, the spring plate having;
        (g) pressing portions formed at front and rear positions of the spring plate with respect to a pair of the bolts and extending toward the fixed bracket from the spring plate, for holding the movable bracket at the rear portion of the fixed bracket by pressing the fixed bracket against the movable bracket on a pair of lines that extend substantially parallel to each other and orthogonally to the long holes of the fixed bracket;
    a shear pin which is fitted into the fitting hole of the fixed bracket and the fitting hole of the movable bracket and connects the fixed bracket and the movable bracket at the rear portion of the fixed bracket;
    a first low friction element which is provided between the fixed bracket and the movable bracket; and
    a second low friction element which is provided between the fixed bracket and the spring plate.

2. The steering column apparatus as claimed in claim 1, wherein:
    as the first low friction element, a front side low friction plate that connects with the movable bracket and a rear side low friction plate that connects with the fixed bracket are provided at vehicle front side and rear side positions with respect to a pair of the bolts between the fixed bracket and the movable bracket, and
    the front side low friction plate and the rear side low friction plate are arranged so as to be positioned at an overlapping position with the pressing portion respectively in an axis direction of a pair of the bolts when the movable bracket is positioned at the rear portion of the fixed bracket.

3. The steering column apparatus as claimed in claim 2, wherein:
    the front side low friction plate and the rear side low friction plate are provided, in each middle in a right-and-left direction thereof, with a cutting portion, and
    part where the pressing portion of the spring plate presses the fixed bracket against the movable bracket through the front side low friction plate and the rear side low friction plate is four positions which are positioned at front and rear sides and right and left sides of the spring plate with respect to a pair of the bolts.

4. The steering column apparatus as claimed in claim 1, wherein:
    as the second low friction element, a second low friction plate is provided between the fixed bracket and the spring plate.

5. The steering column apparatus as claimed in claim 1, wherein:
    the shear pin has, in a middle thereof, a large diameter portion, and has, at both ends thereof, small diameter portions, and
    the fitting hole formed on the attachment portion of the fixed bracket is a large diameter hole where the large diameter portion is inserted and housed, and the fitting hole formed on the attachment part of the movable bracket is a small diameter hole where the small diameter portion is inserted and housed, and
    the spring plate is provided with, as the fitting hole, a small diameter hole where the small diameter portion is inserted and housed.

6. The steering column apparatus as claimed in claim 1, wherein:
    the movable bracket has tilt long holes, and a lock bolt provided at the steering column is inserted into the tilt long holes, which serve to move the steering column in an upward-and-downward direction, and the fixed bracket is fixed to the vehicle body with a front side of the fixed bracket tilting downwardly so that the attachment portion of the fixed bracket is substantially parallel to an axis of the steering column when the lock bolt is set to an uppermost position of the tilt long holes.

\* \* \* \* \*